United States Patent
Ohara (10) Patent No.: US 7,802,976 B2
(45) Date of Patent: Sep. 28, 2010

(54) MOLD FOR MOLDING TIRE AND PNEUMATIC TIRE MOLDED BY THE SAME

(75) Inventor: Masaaki Ohara, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 457 days.

(21) Appl. No.: 11/761,091

(22) Filed: Jun. 11, 2007

(65) Prior Publication Data

US 2007/0284783 A1 Dec. 13, 2007

(30) Foreign Application Priority Data

Jun. 13, 2006 (JP) ............... 2006-163724

(51) Int. Cl.
  *B29C 35/02* (2006.01)
  *B29D 30/00* (2006.01)
(52) U.S. Cl. ............... 425/46; 425/39; 425/47; 425/812; 264/501; 264/326; 249/141
(58) Field of Classification Search ............ 425/47, 425/46, 39, 28.1, 35; 264/501
See application file for complete search history.

(56) References Cited

U.S. PATENT DOCUMENTS

| | | | | |
|---|---|---|---|---|
| 5,234,326 A | * | 8/1993 | Galli et al. ............. | 425/46 |
| 6,382,943 B1 | * | 5/2002 | Metz et al. ............. | 425/46 |
| 7,025,581 B2 | * | 4/2006 | Kata ..................... | 425/46 |
| 7,201,570 B2 | * | 4/2007 | Ohara ................... | 425/46 |
| 2002/0119209 A1 | * | 8/2002 | Tanaka .................. | 425/46 |
| 2006/0257511 A1 | * | 11/2006 | Iwamoto et al. ....... | 425/35 |

FOREIGN PATENT DOCUMENTS

| EP | 1380398 A1 | * | 1/2004 |
|---|---|---|---|
| JP | 05220748 A | * | 8/1993 |
| JP | 2002-361632 | | 12/2002 |

* cited by examiner

*Primary Examiner*—Richard Crispino
*Assistant Examiner*—William P Bell
(74) *Attorney, Agent, or Firm*—Fish & Richardson P.C.

(57) ABSTRACT

The mold for molding a tire has the contact part 42 that contacts with the end surface in the circumferential direction of the adjacent pieces and the non-contact part 44 that does not contact with the end surface in the circumferential direction of the adjacent pieces at the end surface 40 in the circumferential direction of the piece 30 in the segments right after the mold of the cycle of the tire molding process in which the opening and closure of the mold are repeated is closed, and the non-contact part 44 is present in the inner side of the tire radial direction, the contact part 42 is present outside of the tire radial direction than the non-contact part, and right before the mold in the cycle of the tire molding process is opened, the end surface 40 in the circumferential direction of the piece 30 in the segments contacts with the end surface 40 in the circumferential direction of the adjacent pieces in the non-contact part 44.

11 Claims, 8 Drawing Sheets

MOLD FOR MOLDING TIRE AND PNEUMATIC TIRE MOLDED BY THE SAME

The description of this application claims benefit of priority based on Japanese Patent Application No. 2006-163724, the entire same contents of which are incorporated by reference herein.

BACKGROUND OF THE INVENTION

1. Field of the Invention

The present invention relates to a mold for molding a tire of so-called divided-type mold, where a portion that molds a tread is divided in a plurality of segments and said segments are further provided with a plurality of divided pieces, and to a manufacturing method of a pneumatic tire by which molding is conducted using this mold. In more detail, the present invention relates to shapes of end surfaces in the piece circumferential direction for removing residual air between adjacent pieces of said mold and for inhibiting generation of spew.

2. Description of the Prior Art

In molding a pneumatic tire, a sector divided mold in which a portion that molds a tire tread is divided in a tire circumferential direction has been used. The divided portion is called a segment and generally, a segment is divided into 7 to 13. At the time of molding, each segment moves to the inner side of a radial direction toward a tire rotational axis, the mold is closed, and then, the tire is molded. For example, a mold for molding a tire described in Patent Document 1 (Japanese Laid-Open Patent Publication 2002-361632) is known.

In such a mold, when the mold is closed, the space of even 0.1 mm between segments or pieces allows the rubber to advance in said space, which causes the generation of spew of a tire. For solving this, between adjacent pieces, completely closing at least the space that is inner side of the tire radial direction on an end surface in the circumferential direction (the side of the tire design surface) by a certain pressure thereby preventing the rubber from advancing between pieces can be considered. However, this cannot exhaust remnant air and bubbles are formed in the tire caused by entrained air.

Regarding this issue, the Patent Document 1, (Unexamined Japanese Laid-Open Patent Publication No. 2002-361632) for example, suggests providing space portions that are rubber impermeable and gas permeable between adjacent segments.

The Patent Document 1 exemplifies to form a porous coating film by plasma-spraying metallic materials such as chrome, aluminum, and the like as materials for said space portions.

However, the porous coating film by plasma-spraying as mentioned above is inferior as a material for a segment end surface that is liable to wear for repeated collisions by opening and closure of a mold in addition that it causes rising cost of the mold and therefore, frequent spraying is required for reproducing the mold.

The object of the present invention is to provide a highly durable divided-type mold for molding a tire that can inhibit the generation of spew to a molded pneumatic tire and rubber advancement between pieces and to provide a method for molding the tire.

SUMMARY OF THE INVENTION

The present invention utilizes the phenomenon that in the cycle of a tire molding process where the mold is opened, when the part cooled earlier and cooled later are factitively generated in one piece, due to the difference in the coefficient of thermal expansion in each part of the piece, the shape of said piece is subtly deformed.

That is, the present invention has the most important characteristics in that it relates to a mold for molding a tire, with the mold for molding a tire tread comprising a plurality of segments divided in the tire circumferential direction, said segments capable of moving to the tire radial direction, said segments being provided with further divided pieces, and the molding of a pneumatic tire being conducted by the closure of said mold, wherein said each piece is slidable in a tire circumferential direction, right after said mold of a cycle of a tire molding process in which said mold opening and closure are repeated is closed, on the end surface in the circumferential direction of said each piece in said segments, there are the contact part that contacts with the end surface in the circumferential direction of the adjacent pieces in said segments, and the non-contact part that does not contact with the end surface in the circumferential direction of said adjacent pieces in said segments, said non-contact part is arranged inside of the tire radial direction, said contact part is arranged outside of the tire radial direction than said non-contact part, and right before said heated mold is opened in the cycle of said tire molding process, the end surface in the circumferential direction of said piece in said segments contacts with the end surface in the circumferential direction of the adjacent pieces at said non-contact part as well.

In the mold for molding a tire of the present invention, right after the mold is closed in the cycle of the tire molding process in which the opening and closure of the mold is repeated, since there are spaces between pieces, the remnant air is exhausted. As the mold is heated, the spaces get narrower gradually and right before the mold is opened in the cycle of the tire molding process, some spaces between said pieces are closed and therefore, the rubber is hard to advance.

In the present invention, since the air exhaustion in the mold when the mold is closed can be made utilizing the difference between the atmospheric pressure and the air pressure in the mold, no devices for imparting negative pressure such as vacuum pumps and the like are required.

Further, in the mold for molding a tire of the present invention, since the non-contact part is present inside of the tire radial direction and the contact part is present outside of the tire radial direction, by making the length of said non-contact part in the tire radial direction 1 to 5 mm, even when rubber advances between the pieces, the length of the spew can be controlled to be 1 to 5 mm.

Also, when the void portion is provided at the boundary of said contact part and said non-contact part in the embodiment where among a pair of end surfaces in the circumferential direction composed of the adjacent pieces in said segments, said non-contact part of one end surface in the circumferential direction has a protruded portion that protrudes in the tire circumferential direction, said non-contact part of the other end surface in the circumferential direction has a caved portion that caves in the tire circumferential direction in a way that corresponds to said protruded portion, the wear of the mold can be inhibited and therefore, the risk that foreign objects mix into the tire can be prevented.

Moreover, without changing the radiation characteristics depending on the parts of the piece, force-cooling the surface of the tire design side of said piece can obtain the same effect as above when said mold for molding a tire is opened, and therefore, the effect of the present invention can be obtained as well when the ordinary mold is used.

DESCRIPTION OF THE PREFERRED EMBODIMENTS

Hereinafter, an embodiment of the mold for molding a tire according to the present invention will now be explained based on the figures. However, the present invention is not restricted to the embodiments described in these figures.

Figure 1:
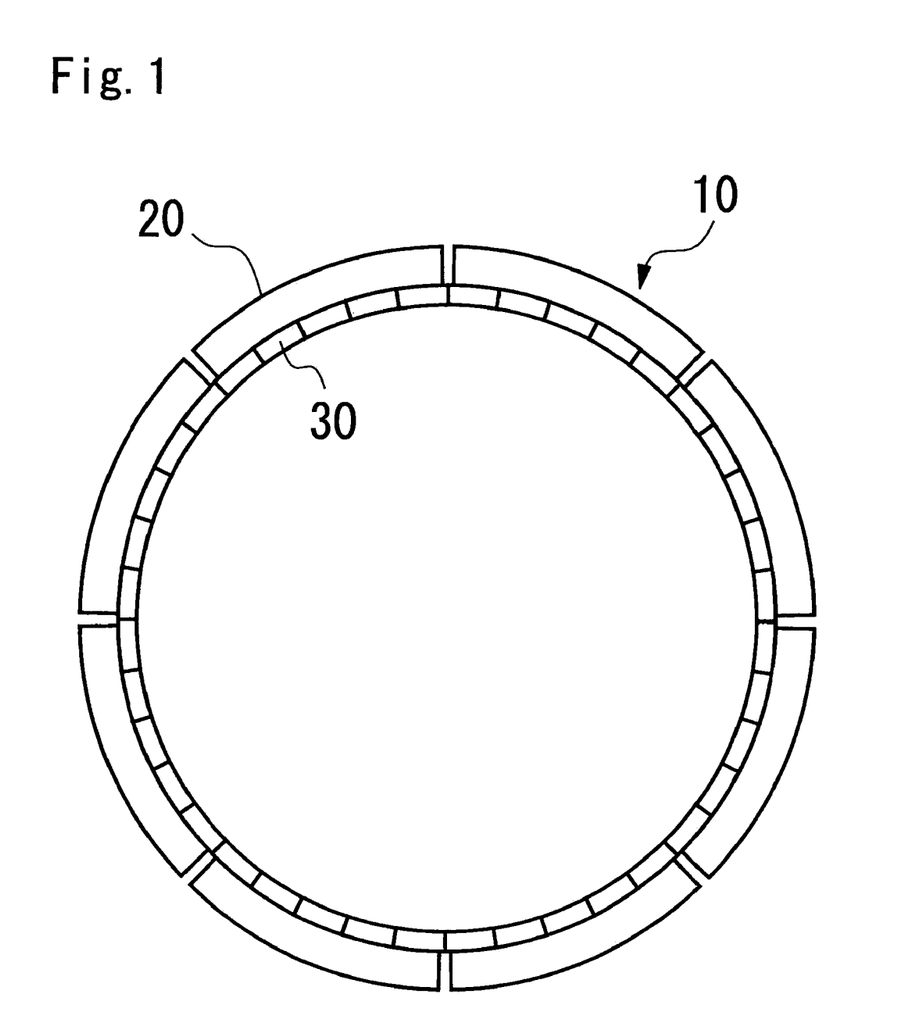
FIG. 1 is a schematic view of a whole mold showing the state that a mold for molding a tire is closed.

FIG. 1 is a schematic view of a whole mold showing the state that a mold 10 is closed.

Figure 2A:
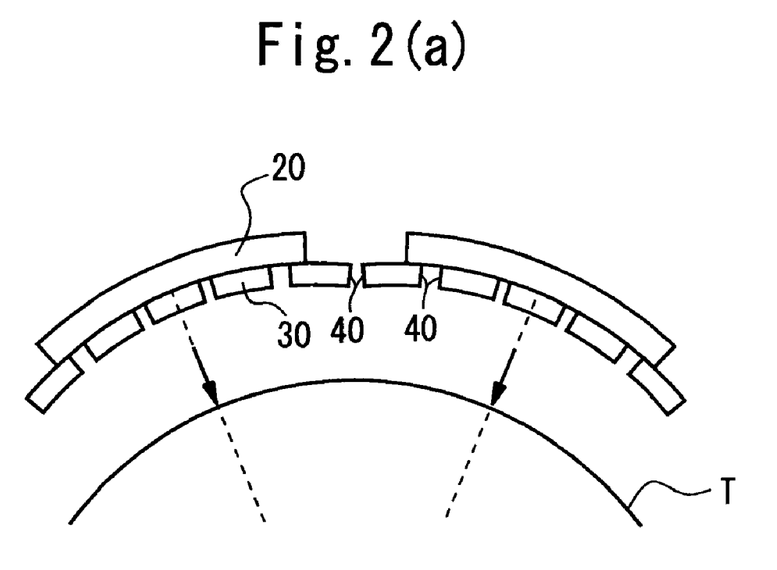
FIG. 2 is an expansion schematic view of one embodiment of FIG. 1.
(a) in the state that the mold is opened.
(b) in the state that the mold is closed.
Figure 2B:
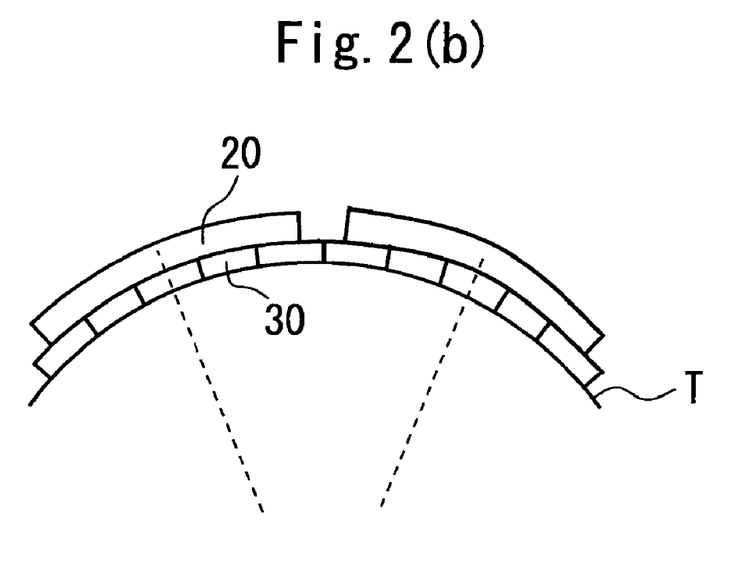

FIG. 2 is a schematic view in which segments positioned at an upper portion of the mold of FIG. 1 are enlarged, FIG. 2 (a) shows the state in which the mold is opened unlike FIG. 1, and FIG. 2(b) shows the state in which the mold is closed like FIG. 1. In the embodiment of the FIG. 1, the mold 10 is divided into 8 segments 20. Each segment 20 can move in the tire radial direction in accordance with the diameter contraction of the mold 10. The reference T in FIGS. 2(a) and (b) shows a tire design surface. For easy observation of the figures, in FIGS.1 and 2, among a plurality of segments and pieces, only one of them was allotted a number (20, 30), respectively.

Further, each segment 20 is provided with 5 pieces 30 that are divided in the tire circumferential direction in the inner side in the tire radial direction (in the side of a tire design surface) in the embodiment of FIG. 1. Each piece 30 can move in the tire radial direction. These pieces 30 are provided with protrusions (not illustrated) that form grooves on a tread surface in the side of the tire design surface of some pieces or all pieces.

Such a mold for molding a tire is sometimes called a divided-type mold for molding a tire. In molding the tire using the divided-type mold for molding a tire, as shown in FIG. 2(b), by the movement of the mold 10 to the inner side of the tire radial direction, said mold 10 closes and forms an integrated mold and then a tire molding is conducted. After the molding, as shown in FIG. 2(a), the mold 10 moves to the outer side in the tire radial direction and the mold is opened, and then the molded tire is taken out. The process of opening and closing the mold 10 is repeated and the tires are molded continuously. Therefore, in general, while the mold 10 is opened, said mold 10 is cooled, and on the other hand, while the mold 10 is closed, said mold 10 is heated. However, in a series of processes for manufacturing tires, generally, the mold 10 is not cooled to a room temperature while it is opened and the mold 10 is closed again before completely cooled and then heated again.

Figure 3A:
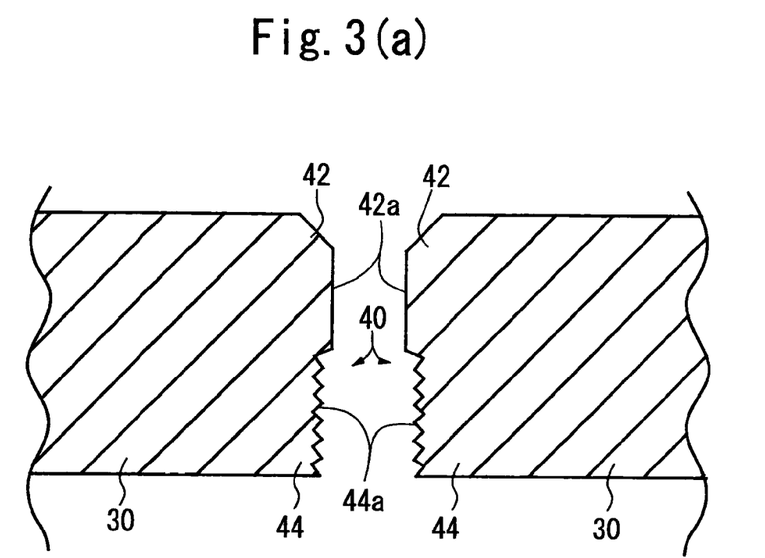
FIG. 3 is a schematic section view of an embodiment between end surfaces in the piece circumferential direction of adjacent pieces.
(a) in the state that the mold is opened.
(b) in the state that the mold is closed.

For example, as shown in FIG. 3(a), in the present invention, by generating fluctuation in cooling in the piece 30 during the process of opening the mold 10, the shape of the piece 30 is made to deform right after the mold 10 is closed, the end surfaces 40 in the circumferential direction of the adjacent pieces 30 do not contact completely, and an air passage 50 through which the air can be exhausted is formed. And such deformation in the shape of the piece 30 is eliminated by heating and by the pieces 30's completely contacting with each other, the air passage 50 is disappeared and the rubber is prevented from advancing. The principle used in the present invention also utilizes the phenomenon that air exhaustion from a fine groove is superior in the early stage of molding, while rubber advancement gets superior after the heating progresses when said fine groove is present inside of a tire design surface of the mold.

Thus, in the present invention, in the cycles of a tire molding process in which opening and closing of the mold 10 is repeated, the part where adjacent pieces 30 contact each other and the contact is generated on the end surface 40 in the circumferential direction of the piece 30 is called the contact part 42 right after the mold 10 is closed, while on the other hand, the part that there is no contact generated at this time is called non-contact part 44. In the present invention, said non-contact part 44 is arranged inside of the tire radial direction (in the side of the tire design surface), while on the other hand, said contact part 42 is arranged outside of the tire radial direction than said non-contact part 44. Here, it is preferable that the length of said non-contact part 44 in the tire radial direction, that is, the length of the air passage 50 is set to be 1 to 5 mm.

As heating progresses, adjacent pieces 30 get to contact with each other at the non-contact part 44 as well, and at the latest, right before said mold 10 is opened in the cycle of said tire molding process, the adjacent pieces 30 contact with each other at the non-contact part 44 as well.

Since the principle of the present invention is as mentioned above, in the cycle of said tire molding process, although the above mentioned effect is not developed in the first process of closing the mold, there is no problem in the manufacturing process since pre-operation is conducted until it reaches to the stable normal condition before conducting continuous operation.

Methods of utilizing irregularity in the temperature of pieces include the method of devising the shapes of the pieces and the method of devising the molding process of the tire. As the shapes of the pieces capable of showing the effect of the present invention, the shapes as described below can be exemplified. FIGS. 3 to 8 are schematic sections showing the examples of the embodiments between the end surfaces in the circumferential direction of the adjacent pieces. For information, in each figure, (a) shows the state where the mold is opened, while (b) shows the state where the mold is closed.

Figure 3B:
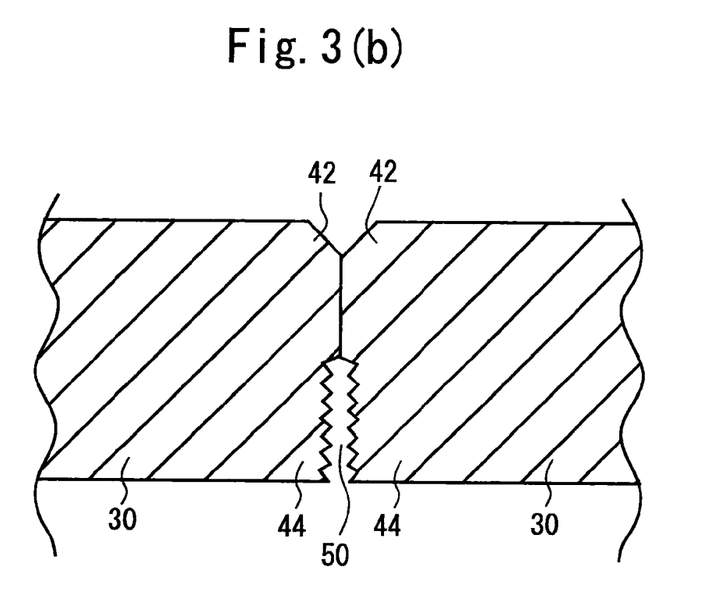
Figure 4A:
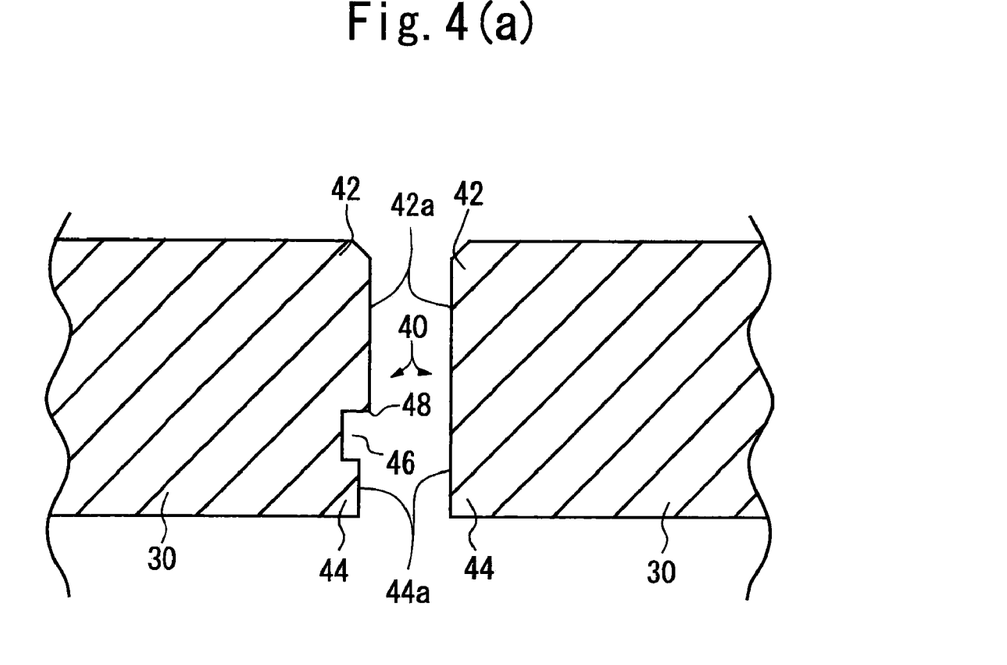
FIG. 4 is a schematic section view of other embodiment between end surfaces in the piece circumferential direction of adjacent pieces.
(a) in the state that the mold is opened.
(b) in the state that the mold is closed.
Figure 4B:
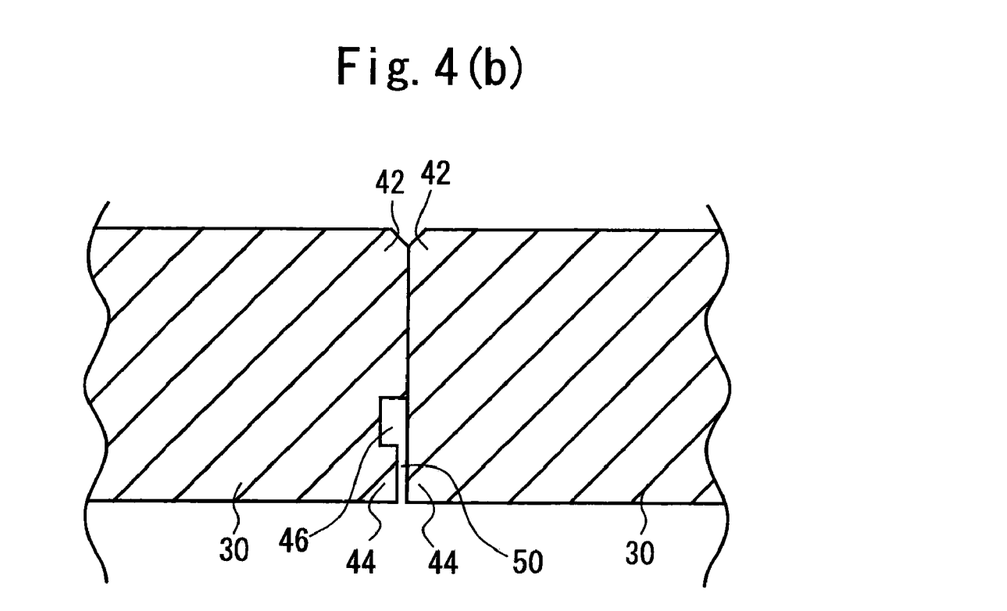
Figure 5A:
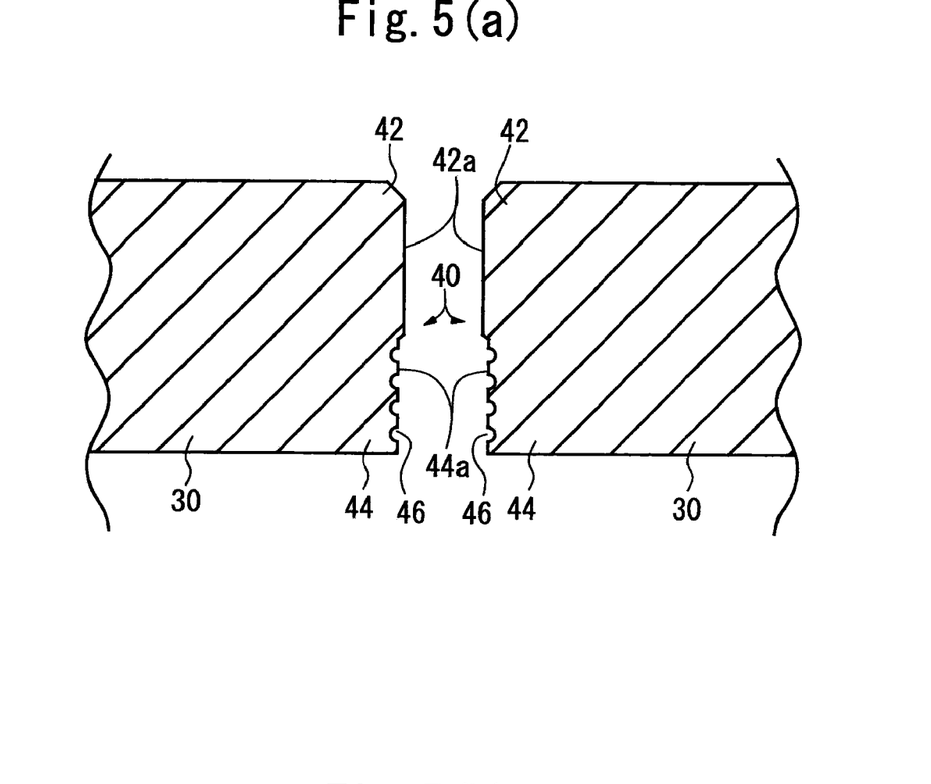
FIG. 5 is a schematic section view of other embodiment between end surfaces in the piece circumferential direction of adjacent pieces.
(a) in the state that the mold is opened.
(b) in the state that the mold is closed.
Figure 5B:
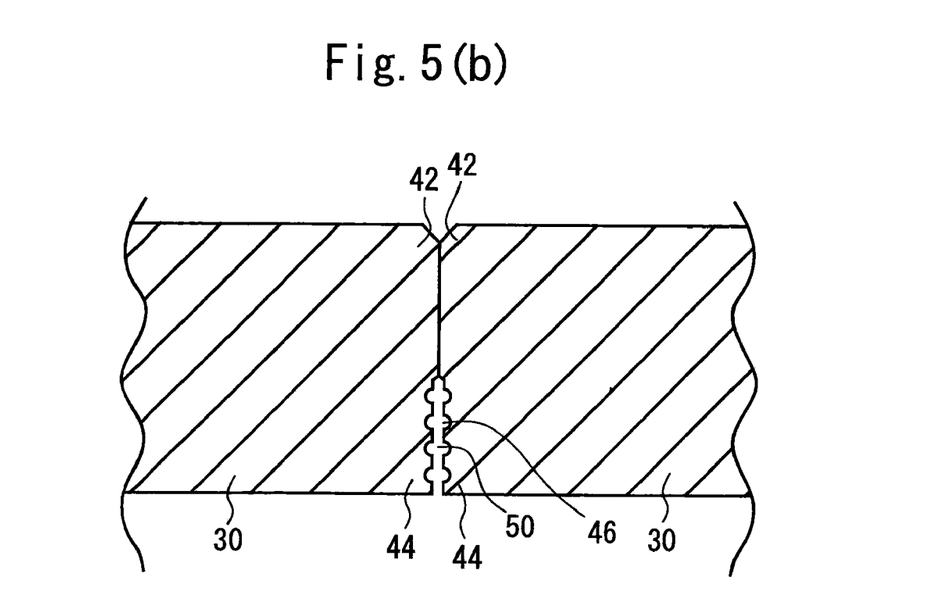

First, the non-contact surface 44a of the non-contact part 44 of the end surface 40 in the circumferential direction of the piece 30 is made to have a rough surface, as shown in FIG. 3. Or as shown in FIGS. 4 and 5, one or a plurality of grooves 46 is provided. That is, the ratio of the real surface area of the non-contact surface 44a with respect to the virtual surface area when the non-contact surface 44a of said non-contact part 44 is made smooth is set to be larger than the ratio of the real surface area of said contact surface 42a with respect to the virtual surface area when the contact surface 42a of said contact part 42 is made smooth. By doing so, radiation performance of the non-contact part 44 gets greater than the radiation performance of the contact part 42, it gets much easier to be cooled while the mold 10 is opened and therefore, the degree of contraction of the piece 30 gets greater.

For information, in the present invention, a rough surface specifically means the embodiment that has random concaves and convexes with the height of about 50 to 200 μm on its surface. Therefore, the real surface area means the surface area taking into account of the random concaves and convexes and the groove 46, while the virtual surface area means the surface area assuming that the surface is smooth without taking into account of the random concaves and convexes and the groove 46. In FIG. 3, a zigzag line shown in the non-contact surface 44a shows that the surface is rough. The same applies to the zigzag lines in FIGS. 6 and 8. As methods of processing said non-contact surface 44a into the rough surface, shot blast etching methods, serrations by machining can be exemplified.

As methods of providing the above mentioned groove 46, as in FIG. 4, among the adjacent pieces 30 in the segment 20, the groove 46 can be provided on the non-contact surface 44a of only one end surface 40 in the circumferential direction, or as in FIG. 5, the groove 46 can be provided on the non-contact surface 44a of both end surfaces 40 in the circumferential direction. Since the real surface area of the groove 46 increases as its number increases, it is more preferable that a plurality of the grooves 46 are provided on the non-contact surface 44a of both end surfaces 40 in the circumferential direction as shown in FIG. 5.

On the other hand, when only one groove 46 is provided on one end surface 40 in the circumferential direction, in order to enhance radiation performance, it is preferable that, as in FIG. 4, the groove is arranged on the non-contact surface 44a that includes the boundary 48 between the contact surface 42a and the non-contact surface 44a and that the depth of the groove 46 is not less than 2 mm. With this embodiment, said groove 46 can take the role of a so-called allowance that absorbs deformation of the piece 30. For information, in the FIG. 4, although the rectangular groove is exemplified, there is no restriction in groove shapes, and the groove may be semi-circle shaped with curvature provided.

Figure 6A:
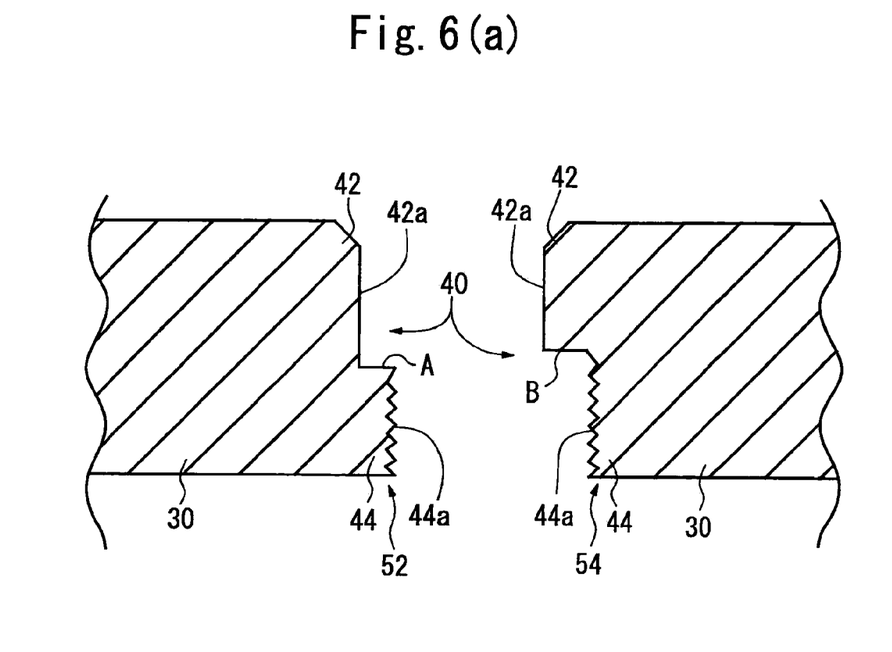
FIG. 6 is a schematic section view of other embodiment between end surfaces in the piece circumferential direction of adjacent pieces.
(a) in the state that the mold is opened.
(b) in the state that the mold is closed.
Figure 6B:
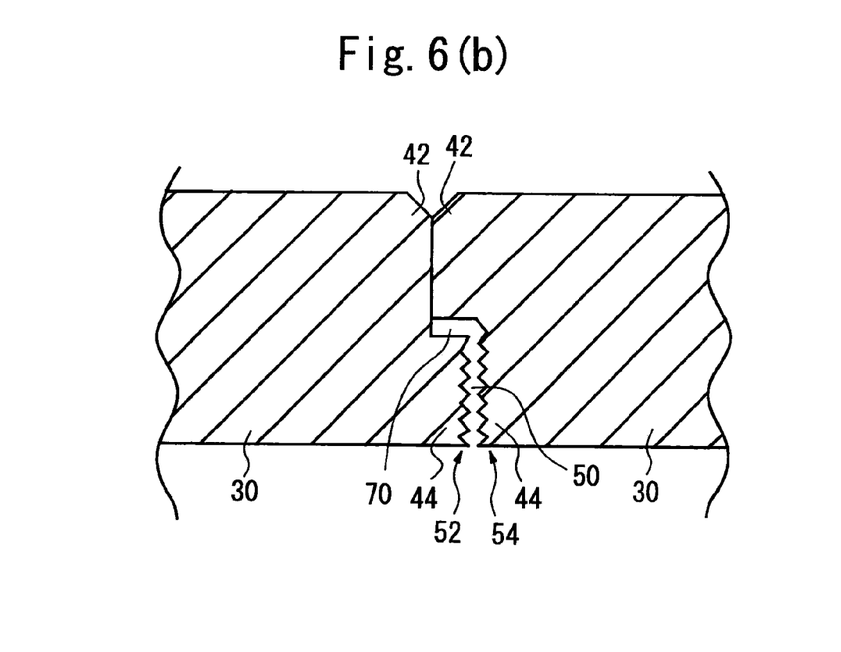
Figure 7A:
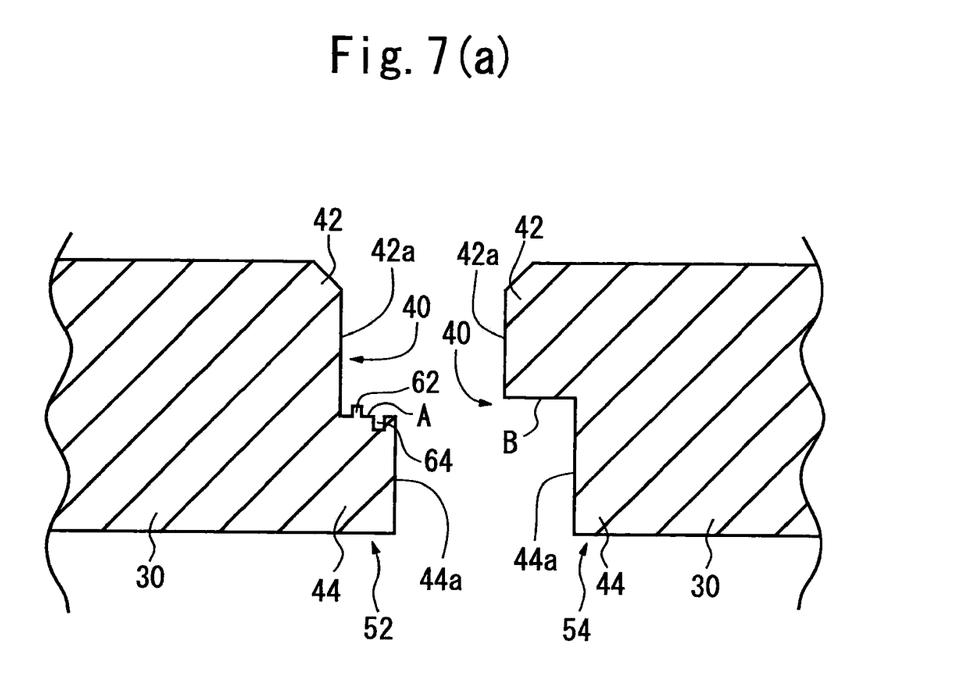
FIG. 7 is a schematic section view of other embodiment between end surfaces in the piece circumferential direction of adjacent pieces.
(a) in the state that the mold is opened.
(b) in the state that the mold is closed.
Figure 7B:
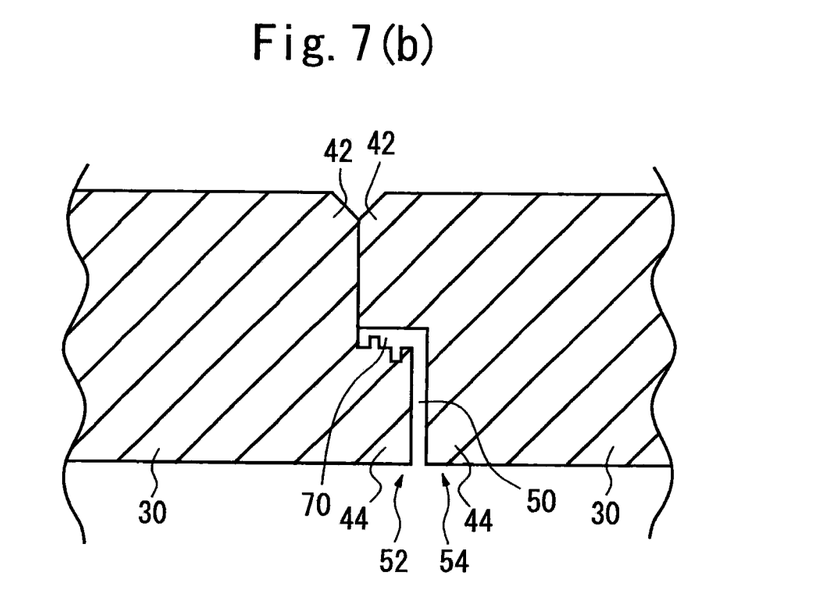
Figure 8A:
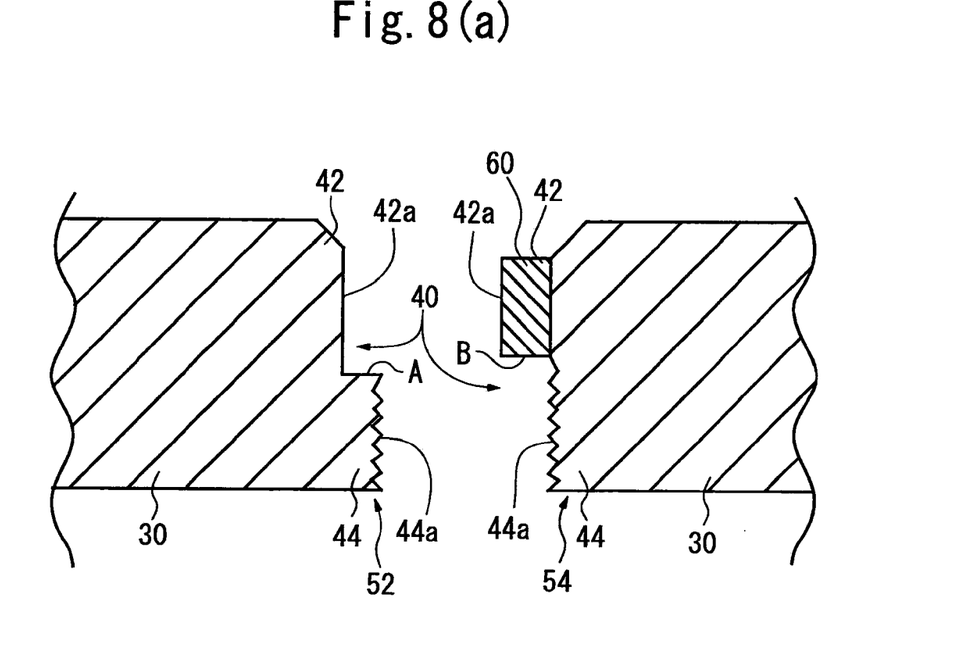
FIG. 8 is a schematic section view of other embodiment between end surfaces in the piece circumferential direction of adjacent pieces.
(a) in the state that the mold is opened.
(b) in the state that the mold is closed.
Figure 8B:
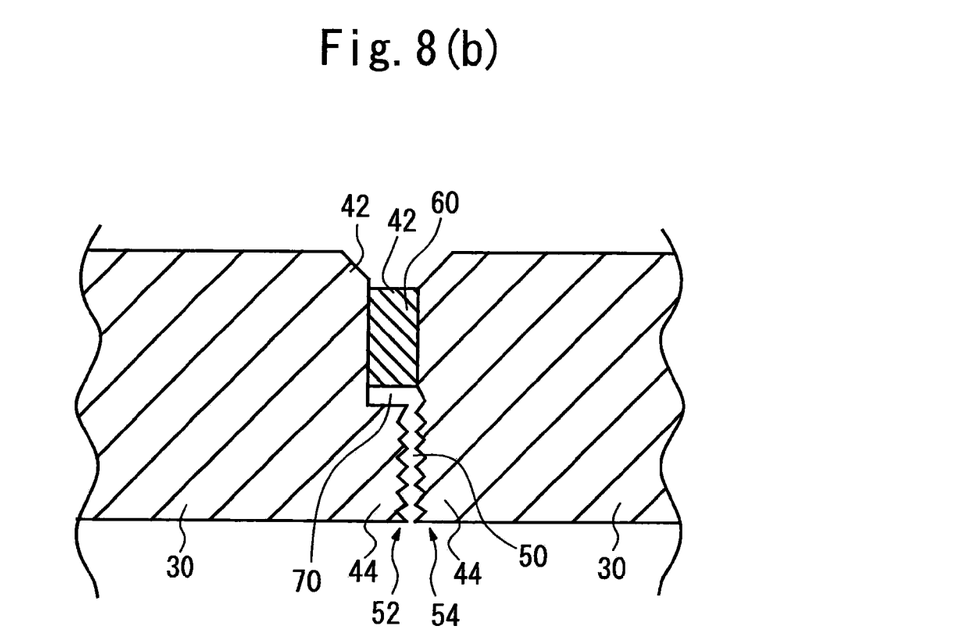

For information, in the mold 10 of the present invention, naturally, it is further preferable to prepare the mold 10 with the surface of the non-contact surface 44a that includes the groove 46 roughened (not illustrated) after providing the groove 46 on the non-contact surface 44a of the end surface 40 in the circumferential direction from the view point of the principle to be utilized in the present invention. Further, as shown in FIGS. 6 to 8, among a pair of the end surfaces in the circumferential direction composed of the adjacent pieces 30 in the segment 20, the non-contact part 44 of one end surface 40 in the circumferential direction has a protruded portion 52 that protrudes in the tire circumferential direction, and the non-contact part 44 of the other end surface 40 in the circumferential direction has a caved portion 54 that caves in the tire circumferential direction in a way that corresponds to the protruded portion 52. And when the connection surface that connects the contact surface 42 and the non-contact surface 44 of the end surface 40 in the circumferential direction of the piece 30 that has the protruded portion 52 is set to be a connection surface A, and when the connection surface that connects the contact surface 42 and the non-contact surface 44 of the end surface 40 in the circumferential direction of the piece 30 that has the caved portion 54 is set to be a connection surface B, the mold 10 capable of showing the effect of the present invention can also be prepared by making the ratio of the real surface area of the connection surface A with respect to the virtual surface area when the connection surface A is made smooth larger than the ratio of the real surface area of the connection surface B with respect to the virtual surface area when the connection surface B is made smooth.

Since cooling at the non-contact part 42 of the piece 30 that has the protruded portion 52 during the process of opening the mold 10 in this embodiment progresses more than other parts, when the mold 10 is closed, it does not completely fit with the piece 30 that has the caved portion 54, and an air passage 50 is generated between the end surfaces 40 in the circumferential direction of the piece 30.

In order to manufacture the piece 30 that has the protruded portion 52 and the caved portion 54 on the end surface 40 in the circumferential direction as mentioned above, cutout of a cross-section surface in the circumferential direction is generally employed. However, in order to manufacture the end surface 40 in the circumferential direction that has the caved portion 54, as shown in FIG. 8, manufacturing can also be made by providing a shim 60 outside of the tire radial direction than the non-contact part 44, that is, on the position corresponding to the contact part 42. When the piece 30 is manufactured by the method of providing the shim 60, manufacturing can be made at a lower cost than when cutout is made for the end surface in the circumferential direction, and further, the durability of the mold is improved by using materials that are less likely to wear than molds. Therefore, it is preferable that the materials for the shim are the same materials as the molds or materials that are less likely to wear than the molds.

In the embodiment where one of the non-contact parts 44 has the protruded portion 52, as shown in FIGS. 6 to 8, it is preferable to make the connection surfaces A and B that connect the contact surface 42a and the non-contact surface 44a of the end surface 40 in the circumferential direction non-contact and to provide a void portion 70 between the connection surfaces A and B. Since cooling is more speedily made at the protruded portion 52 of the end surface 40 in the circumferential direction of the piece 30 than other parts as mentioned above, in the state where the mold 10 is closed, the shape of the piece 30 itself is deformed.

When the connection surfaces A and B that connect the contact surface 42 and the non-contact surface 44 of the end surface 40 in the circumferential direction are contacted, the mold 10 wears at this contact part and may cause mixing of the foreign matters in the tire. Therefore, when the void portion 70 is provided at the boundary between the connection surface A and B, the void portion 70 becomes a so-called allowance to said deformation, and therefore, the wear of the mold 10 is inhibited.

Also, in the embodiment where one of the non-contact part 44 has the protruded portion 52, it is preferable to make the ratio of the real surface area of the connection surface A with respect to the virtual surface area when the connection surface A is made smooth is larger than the ratio of the real surface area of the connection surface B with respect to the virtual surface area when the connection surface B is made smooth. The reason is that the cooling effect at the protruded portion 52 becomes greater. For information, the definition of the virtual surface area and the real surface area is as mentioned already.

In order to make the real surface area of the connection surface A large, there are methods such as roughening the connection surface A as shown in FIG. 6 and methods such as providing ribs 62 or grooves 64 as shown in FIG. 7. In order to show the above mentioned effect, it is preferable that the length in the tire circumferential direction of said connection surfaces A and B is set to be about 10 mm.

Other than the method of showing the effect of the present invention by devising the shapes of the end surfaces in the circumferential direction of the piece as mentioned above, by providing the process where the surface in the tire design side of said piece is force-cooled in the process where said mold for molding a tire is opened, the effect of the present invention can be shown. According to this method, the effect of the present invention can be obtained regardless of the shapes of the end surfaces in the circumferential direction of the piece.

However, in the present invention, the mold must be closed before all the parts of the piece are cooled to a room temperature and there is no more irregularity in temperature. In general, the molding of a tire is conducted at a temperature of 160 to 170° C. Taking into account of the seasonal changes of the room temperature, the time for the process when the mold is opened must be within 120 seconds in the cycle of the tire molding process in which the opening and closure of the mold are repeated. On the other hand, since the cooling of the mold is generated right after the mold is opened, taking account of the time for taking out the molded tire, no matter how fast the operation of taking out the tire is conducted, non-uniform cooling of the piece required for the manufacturing method of the present invention is generated during the time for completing taking out of the tire and for closing the mold again.

As force-cooling methods, the method of air-cooling by sending air only to the surface in the tire design side can be easily employed. However, the method of water-cooling the surface in the tire design side can also be employed. In the case of water-cooling, it is necessary to adjust the time for cooling so that the whole piece 30 is cooled with too much cooling.

What is claimed is:

1. A mold for molding a tire, with the mold for molding a tire tread comprising a plurality of segments divided in the tire circumferential direction, said segments capable of moving in the tire radial direction, said segments being provided with further divided pieces, and the molding of a pneumatic tire being conducted by the closure of said mold, wherein
   said each piece is slidable in the tire circumferential direction,
   right after said mold of a cycle of a tire molding process in which said mold opening and closure are repeated is closed,
   on an end surface in the circumferential direction of said each piece in said segment,
   there are a contact part that contacts with the end surface in the circumferential direction of the adjacent piece, and a non-contact part that does not contact with the end surface in the circumferential direction of said adjacent piece,
   said non-contact part is arranged inside of the tire radial direction, said contact part is arranged further outside in the tire radial direction than said non-contact part,
   a non-contact surface substantially parallel to the tire radial direction of said non-contact part is a rough surface having random concaves and convexes with a height of about 50 to 200 μm, and
   right before said heated mold is opened irk the cycle of said tire molding process,
   the end surface in the circumferential direction of the pieces in said segments contacts with the end surface in the circumferential direction of the adjacent pieces at said non-contact part as well.

2. The mold for molding a tire as set forth in claim 1, wherein the length of said non-contact part in the tire radial direction is 1 to 5 mm.

3. The mold for molding a tire as set forth in claim 1, wherein the ratio of the real surface area of said non-contact surface with respect to a virtual surface area when the non-contact surface of said non-contact part is assumed to be a smooth surface is larger than the ratio of the real surface area of said contact surface with respect to a virtual surface area when the contact surface of said contact part is assumed to be a smooth surface.

4. The mold for molding a tire as set forth in claim 1, wherein among a pair of end surfaces in the circumferential direction composed of the adjacent pieces in said segments,
   said non-contact part of one end surface in the circumferential direction has a protruded portion substantially parallel to the tire width direction, which protrudes from said contact part in the tire circumferential direction,
   said non-contact part of the other end surface in the circumferential direction has a caved portion substantially parallel to the tire width direction, which caves from said contact part in the tire circumferential direction,
   when a surface substantially parallel to the tire circumferential direction of the non-contact surface which connects the contact surface of one end surface in the circumferential direction and a surface substantially parallel to the tire radial direction of the non-contact surface is set to be a connection surface A and when a surface substantially parallel to the tire circumferential direction of the non-contact surface, which connects the contact surface of the other end surface in the circumferential direction and a surface substantially parallel to the tire radial direction of the non-contact surface is set to be a connection surface B,
   the ratio of the real surface area of said connection surface A with respect to a virtual surface area that is the surface area when said connection surface A is assumed to be a smooth surface is larger than the ratio of the real surface area of said connection surface B with respect to a virtual surface area that is the surface area when said connection surface B is assumed to be a smooth surface.

5. The mold for molding a tire as set forth in claim 4, wherein a shim is provided on a contact surface of said other end surface in the circumferential direction and said caved portion is formed on a contact surface of said other end surface in the circumferential direction.

6. The mold for molding a tire as set forth in claim 4, wherein ribs and/or grooves are provided on said connection surface A and said connection surface B has a smooth surface.

7. The mold for molding a tire as set forth in claim 4, wherein a void portion is provided between said connection surface A and said connection surface B.

8. A mold for molding a tire, with the mold for molding a tire tread comprising a plurality of segments divided in the tire circumferential direction, said segments capable of moving in the tire radial direction, said segments being provided with further divided pieces, and the molding of a pneumatic tire being conducted by the closure of said mold, wherein
- said each piece is slidable in the tire circumferential direction,
- right after said mold of a cycle of a tire molding process in which said mold opening and closure are repeated is closed,
- on an end surface in the circumferential direction of said each piece in said segment,
- there are a contact part that contacts with the end surface in the circumferential direction of the adjacent piece, and a non-contact part that does not contact with the end surface in the circumferential direction of said adjacent piece,
- said non-contact part is arranged inside of the tire radial direction, said contact part is arranged further outside in the tire radial direction than said non-contact part,
- a plurality of grooves extending in the tire width direction are provided at said non-contact surface substantially parallel to the tire radial direction of said non-contact part on at least one end surface in the circumferential direction, and
- right before said heated mold is opened in the cycle of said tire molding process,
- the end surface in the circumferential direction of the pieces in said segments contacts with the end surface in the circumferential direction of the adjacent pieces at said non-contact part as well.

9. The mold for making a tire as, set forth in claim 8, wherein the length of said non-contact part in the tire radial direction is 1 to 5 mm.

10. The mold for molding a tire as set forth in claim 8, wherein the ratio of the real surface area of said non-contact surface with respect to a virtual surface area when said non-contact surface of said non-contact part is assumed to be a smooth surface is larger than the ratio of the real surface area of said contact surface with respect to a virtual surface area when said contact surface of said contact part is assumed to be a smooth surface.

11. The mold for molding a tire as set forth in claim 8, wherein said grooves are arranged on said non-contact surface that includes the boundary between said contact surface and said non-contact surface and the depth of said grooves is not less than 2 mm.

* * * * *